United States Patent Office 3,395,925
Patented Aug. 6, 1968

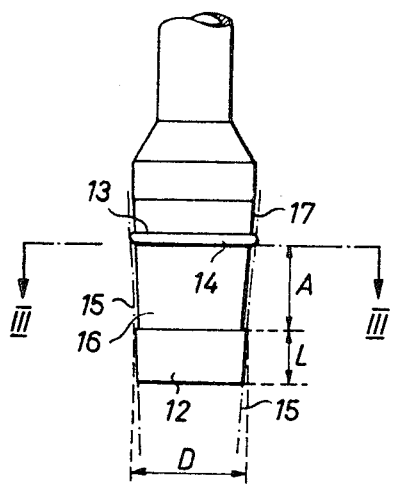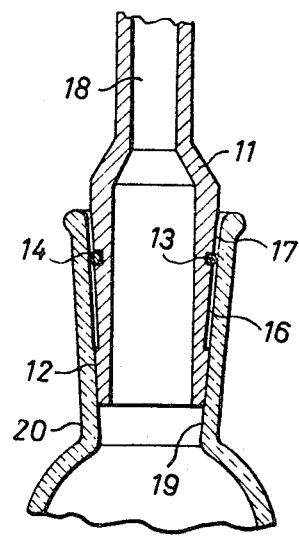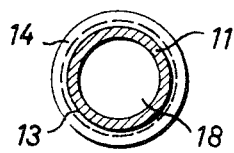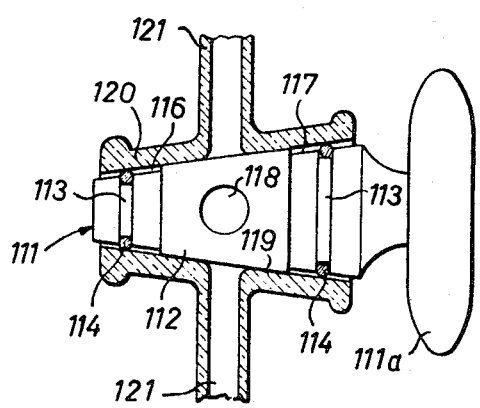
INVENTOR.
André S. Dreiding

3,395,925
PLUG CONNECTOR OR STOPPER WITH A TUBULAR OUTER COMPONENT INTO WHICH A REMOVABLE INNER COMPONENT IS FITTED IN SEALING RELATIONSHIP
André S. Dreiding, Laubholzstrasse 48, Erlenbach, Switzerland
Filed July 14, 1966, Ser. No. 565,229
Claims priority, application Switzerland, July 16, 1965, 10,262/65
2 Claims. (Cl. 277—168)

ABSTRACT OF THE DISCLOSURE

A plug and socket joint for chemical laboratory equipment having a tubular outer component into which a removable inner component can be fitted to form a seal with one of the components having a conical seating and the other a corresponding seating face tapered at the same angle with surfaces of different diameter and a resilient member in a shallow recess.

---

The invention relates to a plug connector or stopper having a tubular outer component into which a removable inner component can be fitted to form a good seal, one of these two components being provided with a standard conical seating and the other with a corresponding seating face tapered at the same angle, so that, when the component parts are fitted one into the other, these seating surfaces come into direct contact and form the seal.

Plugs of the type described are frequently used, mainly in chemical laboratories and the chemical engineering industry, as closures for containers, for connecting flasks to tubing, for coupling lengths of tubing together, in stopcocks and taps, and so forth. Hitherto, it has been usual—and necessary, to seal and support the connected parts properly—for the conical seatings on both components to be generously dimensioned in the axial direction.

As a result of this, it is often extremely difficult, or even quite impossible, for the components, once tightly fitted together, to be turned in relation to each other or pulled apart. The reason is that, on the somewhat large surfaces in contact between the two parts, the forces of adhesion and friction arising may be very great and chemicals may dry on to the seatings and subsequently act as adhesives.

Because of the rigidity of the components and the large axial dimensions of their conical seatings, the latter cannot usually be moved the trifling amount which would assist their release. Violent attempts to undo the jammed assembly therefore frequently lead to damaging one or other of the parts thereof, especially when these are, as usual, made of glass.

In addition to the drawbacks already mentioned, it often happens, with the plugs and stoppers in use hitherto, that the mechanical hold of the parts when fitted together is inadequate, at all events when the interior of the system is at or slightly above atmospheric pressure and even, during the moment immediately following closure, when the system is brought under vacuum. It is therefore essential either to employ special additional fixings or clips or to use immoderate force in pressing the members together or turning them home, which merely makes it still more difficult to release the connection subsequently.

These disadvantages are familiar to those with knowledge of such matters; and proposals have already been disclosed for their elimination.

One such proposal is that one of the conical seatings should be faced with a rubbery material; another is that the inner member or plug should be provided with two resilient packing rings spaced apart one behind the other, seated in peripheral grooves in the plug, these rings, and not the conical external seating face, providing the desired seal and support against the internal seating face on the tubular outer member. While both these proposals may resolve the difficulties described above, for many purposes they introduce a further disadvantage, namely that the resilient packing material can come into contact with the liquids or gases passing through tubes fitted with such plug-type connectors or held in containers or the like closed with such stoppers. According to the liquids or gases concerned, these may undergo changes caused by the packing material, or the packing material may itself be changed by them.

The present invention sets out to eliminate all these drawbacks and to provide a plug connector or stopper of the type referred to at head hereof, which needs no packing rings or facings to give a good seal and yet enables the component members to hold firmly together and to be undone when required.

This purpose is achieved by the plug or stopper here proposed, primarily by virtue of the fact that the periphery of one of the two components has a resilient member fitted in a superficial recess and that this member, when unstressed and in a state of rest, projects radially beyond an imaginary cone defining the conical seating of the said component, so as to come into contact with the other component and be held to it by friction, while being readily releasable.

In a plug or stopper so constructed, the resilient member, which may be a ring fitted in a peripheral groove in the component concerned, serves not as a seal, but primarily to bring about a good yet readily releasable grip between the components when they are fitted together. The conical seatings need no longer be forced so hard together to achieve this. One striking feature that has emerged is that a perfect seal can still be obtained when the axial length of one of the conical seatings is made considerably smaller than is the case with the plugs and stoppers used hitherto. It is thus possible for the resilient member to be spaced away from one end of the axially shortened seating, without any risk of the said member no longer making contact with the standard-sized seating on the other component.

In one recommended form of the invention, the axial length of the conical seating on the inner component is less than its largest diameter and even smaller than the distance between it and the resilient member.

Further details, features and advantages of the object of the invention will become apparent from the patent claims, the description of practical examples which now follows and the accompanying drawings, in which latter:

FIGURE 1 is an axial section of one form of stopper connector, showing the components fitted together;

FIGURE 2 is a side elevation of the inner component of the same stopper assembly;

FIGURE 3 is a cross-section along the line III—III in FIGURE 2; and

FIGURE 4 shows another example of the invention, in the form of a cock of the rotary-plug type, partly in axial cross-section.

The stopper assembly shown in FIGURES 1 to 3 has an inner component with a stopper-like body, 11, tapering conically towards one end. At the smaller end of body 11 is a conical external seating, 12, the axial length, L, of which is considerably smaller than the maximum diameter, D, of this seating. In the example illustrated, dimension L is equal to about one-half of dimension D, but that is not necessarily so in all cases.

At a distance of A from that end of seating 12 which is of the maximum diameter D, body 11 has a peripheral groove, 13, in which is fitted a ring of resilient material, such as synthetic rubber or a rubbery plastics, for example. Distance A should preferably be greater than axial length L of conical seating 12. Ring 14, which is not fixed in any way within groove 13, has the outer portion of its periphery projecting from body 11 and also extending slightly beyond the imaginary cone 15 which defines conical seating 12. Between seating 12 and ring 14, outer face 16 of body 11 lies slightly back from imaginary cone 15. The same applies to that part of body 11 which is adjacent to ring 14 and which lies beyond it as seen from seating 12.

Stopper-like body 11 should preferably be made of polytetrafluoroethylene or polyoxymethylene, but it may also be of glass, ceramic material or metal. In the example shown, it is pierced axially at 18, so that it can form part of a tube connection.

In a variant form, not illustrated here, the stopper-like body may also consist of a blank plug, which can be used for stoppering containers or closing the ends of tubing.

Components 11 and 14 together form a removable stopper for insertion in the standard-sized conical interior seating, 19, of a tubular member, 20, such as the example shown in FIGURE 1. Conical interior seatings of this kind are regularly used in a few standard types and sizes for appliances, tubing, bottles, flasks and so on in chemical laboratories and in the chemical engineering industry. Their angle of taper in relation to their longitudinal centre line corresponds to the angle made by curved face 15 of the imaginary cone and by external seating 12 with the longitudinal centre line of body 11. It is usual to make tube end 20 of glass and to grind interior seating 19.

When the plug assembly described, 11/14, is correctly inserted in tubular member 20, external conical seating 12 on body 11 and resilient ring 14 both make contact all round with interior conical seating 19 of the tubular member, ring 14 being elastically compressed. The seal between body 11 and its counter-member 20 lies between the conical seatings in contact, 12 and 19, and is sufficiently effective, notwithstanding the small axial length, to form a vacuum-tight closure, but it would not in itself meet mechanical requirements. The requisite mechanical hold of the connection is given by the grip between ring 14 and interior conical seating 19 of member 20. The seal between conical faces 12 and 19 ensures that the liquid or gas in a container fitted with member 20 or in a pipe line of which this member and body 11 form part is kept away from ring 14, so that this cannot be attacked by the liquid or gas. As the nature of the adhesion between resilient ring 14 and interior seating 19 is completely different from that between seating 19 and rigid external seating 12, ring 14 will still give body 11 a good mechanical hold on member 20 and provide an excellent seal if, for any reason, the fit between conical seatings 12 and 19 should be loosened or should not have been properly made.

In a system that is to be brought under vacuum, for example, ring 14 forms an initial seal if conical faces 12 and 19 are not quite in close contact. Thus, some degree of vacuum can form within the system, so that the plug component is drawn automatically into member 20 until seatings 12 and 19 are fully in contact.

Contrary to the external conical seatings in use hitherto, which are comparatively long axially, the far shorter external seating 12 and the resilient packing ring 14 of the connector here described permit some degree of obliquity in the fitting of body 11 into member 20, especially when body 11 or member 20 is made of plastics. Even when both members, 11 and 20, are made of glass, however, at least one of these members will be resilient enought to permit slight deformation without breakage. This makes it far easier to free the connection and then take it apart. To do this, body 11 may be moved slightly to and fro, while a pull is exerted on it, away from member 20, if the components are to be separated. It is particularly helpful to apply a screwing action to parts 11 and 20 when the assembly is being undone, since the frictional grip of ring 14 on interior seating 19 is considerable when a purely axial pull is applied, so that ring 14 may exert a locking action between body 11 and member 20. The rotation of parts 11 and 20 in relation to each other is facilitated if ring 14 is free to slip within groove 13.

The greatly reduced size of external conical seating 12, by comparison with that of the type used hitherto, saves labour on the accurate finishing of this seating. The plug connector described has the advantage of improved mechanical grip when put together; it provides an equally effective seal and is decidely easier to release from any kind of tubular member having a standard ground interior seating. The ease of removal prevents the damage and even destruction that has hitherto often been caused by the jamming of conical plug connectors.

Although the existence of a certain spacing, A, between resilient ring 14 and the wider end of external conical seating 12 improves the holding power and the ready release of the plug or stopper, the external conical seating on body 11 may, if desired, extend as far as or even beyond ring 14.

To produce the requisite frictional grip, the continuous rings 14 provided in the example illustrated may equally well be replaced by two or more separate resilient members. Each such member should then be lodged in its own recess in the outer face of body 11, these recesses and the resilient members themselves being so shaped as to ensure that the latter cannot fall out of body 11 when the connection is unplugged. Another possibility would be to attach the resilient members to body 11 with an adhesive. Any such separate resilient members, when in the unloaded condition or state of rest, should project sufficiently to extend slightly beyond imaginary cone 15.

In the example of the invention illustrated in FIGURE 4, the inner and outer components respectively constitute the plug and outer casing of a cock. The plug has a body, 111, provided with external conical seating 112. This seating, unlike those of plug-cocks of earlier types, is axially comparatively short, its length being approximately equal to its maximum diameter. In the axial direction, body 111 is considerably longer than that portion which carries seating 112; and external faces 116 and 117, at each side of seating 112, lie back from the latter. In each of these recessed faces 116 and 117 and spaced away from the ends of conical seating 112, a peripheral groove, 113, is provided, within which a continuous ring of resilient material 114, is freely fitted. When in a state of rest, without load, rings 114 project radially outwards, slightly beyond the imaginary cone which defines seating 122. The whole of passage 118, which passes transversely through body 111, opens at both ends within conical seating 112. One end of body 111 has a handle, 111a, for operating the cock.

The outer component of the cock is provided in the conventional manner with a standard-sized interior ground conical seating 119 formed in tubular casing 120. This casing is fitted with pipe connections 121 which are interconnected by way of passage 118 when the plug is in the appropriate position and isolated from each other when the plug is turned to another position.

The seal between casing 120 and plug body 111 is provided by seatings 112 and 119, which are in direct contact with each other, whereas the resilient rings, by virtue of their frictional grip, are responsible for giving the plug a proper mechanical hold within casing 120. Rings 114 are only slightly compressed between seating 119 of the casing and the base of grooves 113, so that to all intents and purposes, they do not hinder the turning of the plug within casing 120. The area in contact between casing 120 and plug body 111 being small as compared to the cocks of this type used hitherto, the plug is far easier to turn than previously. Greasing the conical seatings 112 and 119, as has sometimes been necessary in the past, is no longer called for. Hence, the difficulties sometimes arising from interaction between grease and the liquid or gas passing through the cock are entirely eliminated. Should the plug chance to bind in the outer casing, these members can be readily moved and taken apart in the same way as explained in the first example. Rings 114 are protected by the close seating of faces 112 and 119 from the action of the liquids or gases flowing through the cock. If seating 112 of the plug should fail for any reason to fit closely to seating 119 in casing 120, rings 114 prevent the plug from dropping out of the casing, the rings then taking over the function of acting as a seal and preventing the liquid or gas from leaking along the plug into the atmosphere.

The plug in the cock just described can be just as easily extracted from casing 120 for cleaning and subsequent replacement as in the case of plug connector 11/14 in the first example. It is preferable to make body 111 of polytetrafluoroethylene or polyoxymethylene, but both it and casing 120 may also be made of glass.

In other variants of these examples, which are not shown in the drawings, ring 14 or rings 114 may be fitted to the outer component and work against surfaces on the inner component. In either case, it is not essential for the surfaces against which the rings or other alternative resilient members bear to be ground, nor need they be conical.

To form a leak-proof, mechanically sound, releasable connection between two tube ends, each of which has a standard interior ground conical seating, an intermediate tubular member may be used, both ends of which are formed like plug connector 11/14 in FIGURES 1 to 3. Vice versa, the ends of the intermediate member may naturally be provided with interior seatings if the tube ends to be joined together have external conical seatings. In either case, the resilient rings or the like may be fitted either to the intermediate member or to the tube ends, though the former arrangement is better.

What I claim is:
1. A plug and socket joint for chemical laboratory equipment having a tubular outer component into which a removable inner component can be fitted to form a seal, one of said components having a conical seating and the other having a corresponding seating face tapered at the same angle, so that, when the component parts are fitted one into the other, the seating surfaces come into direct contact and form a seal, one of the two components having a peripheral zone, at least one resilient member in a shallow recess, said member, when unstressed and in a state of rest, projecting radially beyond an imagianry cone by which the conical seating of the component in question is defined, so as to come into contact with the other component and be held thereto by friction, while being readily releasable, the axial length of the conical seating surface of one of the components which is fitted with the resilient member being less than its largest diameter thereof and less than the axial length of the seating of the other component, and the resilient member being axially spaced away from the adjacent end of the conical seating of the component bearing the said member, the portion of the periphery of the said component which is situated between the seating and the resilient member being set back from the face of the conical seating.

2. A plug and socket joint as defined in claim 1, in which the distance between the resilient member and the conical seating of the component is greater than the axial length of the seating.

References Cited
UNITED STATES PATENTS

| | | | |
|---|---|---|---|
| 2,946,606 | 7/1960 | Smith | 215—48 X |
| 3,140,097 | 7/1964 | Luertzing | 215—48 X |
| 3,142,474 | 7/1964 | La Von Nelson | 251—309 |

DONALD F. NORTON, *Primary Examiner.*